United States Patent [19]

Sfeir

[11] 3,892,875

[45] July 1, 1975

[54] PROCESS FOR THE PRESERVATION OF SEA URCHIN GONADS BY QUICK FREEZING

[75] Inventor: Alberto Sfeir, Santiago, Chile

[73] Assignee: Corporacion de Fomento de la Produccion, Santiago, Chile

[22] Filed: June 17, 1974

[21] Appl. No.: 480,240

Related U.S. Application Data

[63] Continuation-in-part of Ser. No. 322,726, Jan. 11, 1973, abandoned.

[30] Foreign Application Priority Data

Jan. 14, 1972 Chile.......................................... 2572

[52] U.S. Cl. ................ 426/303; 426/327; 426/310; 426/524; 426/506
[51] Int. Cl............................................. A23b 1/02
[58] Field of Search ........... 426/302, 303, 310, 321, 426/327, 332, 227, 524

[56] References Cited

UNITED STATES PATENTS

| | | | |
|---|---|---|---|
| 2,758,930 | 8/1956 | Toulmin............................. | 99/158 |
| 2,839,410 | 6/1958 | Nelgerud........................... | 99/195 |
| 2,933,399 | 4/1960 | Nickerson.......................... | 99/158 |

FOREIGN PATENTS OR APPLICATIONS

| | | | |
|---|---|---|---|
| 466,380 | 1971 | Japan.................................. | 426/203 |
| 862,088 | 3/1961 | United Kingdom................. | 99/160 |
| 916,208 | 1/1963 | United Kingdom................. | 99/195 |

*Primary Examiner*—Norman Yudkoff
*Assistant Examiner*—Hiram H. Bernstein
*Attorney, Agent, or Firm*—Karl W. Flocks

[57] ABSTRACT

The preservation of sea urchin gonads for periods over 6 months is obtained by resting the gonads in a solution of sodium chloride, treating them in an aqueous solution containing sodium chloride, a sodium phosphate and an antioxidizing agent; and quick freezing them.

2 Claims, No Drawings

PROCESS FOR THE PRESERVATION OF SEA URCHIN GONADS BY QUICK FREEZING

FIELD OF INVENTION

This is a continuation-in-part of application Ser. No. 322,726 filed January 11, 1973 and now abandoned.

The invention involves procedures to preserve sea urchin gonads, thus allowing that they may be subsequently consumed without loss of their organoleptical qualities.

BACKGROUND OF THE INVENTION

The preservation of animal food species extracted from the sea is normally carried out through drying, or salting, or smoking, or canning, or freezing procedures. All such techniques, however, are generally susceptible to be used on fish, yet the former four may not be applied to preserve fresh shellfish.

The preservation of fresh shellfish, therefore, is identified with the freezing techniques, using moreover chemical additives. The supplement of these additives is featured by its highly specific method of application, in such a way that a determined addition system is required for each specific species of shellfish, both insofar as to the additives used, the particular conditions of operation, and the concentration of additives allowed in each case. These factors determine the applicability of the chemical agents involved for each product thus featuring the method of preservation for each species of shellfish. There are flavor additives, such as sodium glutamate, used in such cases that require emphasizing a flavor that is lost through the freezing process. Nevertheless, sodium glutamate may not be used when its presence turns the product, for one reason or another, unacceptable for consumption. There are other additives, including coloring additives, that make it possible to maintain the texture or other properties of the shellfish. The indicated limitation applies to all of them, however, inasmuch as certain seafoods do not accept the use of given additives.

The most usual and generally applied freezing technique — used in the preservation of shrimp and crayfish, for instance — involves the following stages:
a. Cooking;
b. Extracting the flesh;
c. Pasteurizing;
d. Flavoring, for which purpose salt water, sodium glutamate, etc. are used;
e. Molding;
f. Freezing;
g. Packing;
h. Cold Storing.

The physical and chemical features of the sea urchin gonads do not, at present, permit the use of the freezing method. Once extracted, they rapidly decompose. The only known commercial system of preservation is the traditional canning method. In order to avoid fast decomposition, it is necessary to sterilize the gonads by cooking them. This process turns them into a cooked paste that is devoid of the natural appearance, flavor, odor and texture characteristics of the sea product.

It is likewise customary to turn to certain domestic methods of preservation that, however, do not allow the gonads to keep properly preserved more than 100 hours. Such is the method of placing the raw product in air tight bottles or jars and storing them at a very low temperature. The useful life of the product in this case is very brief, and it soon looses its color, flavor and texture, soon developing a very sharp and disagreeable odor that makes it impossible to ingest within a short term.

SUMMARY

It is, accordingly, an object of the present invention to obviate the difficiencies of the prior art, such as indicated above.

It is another object of the invention to make feasible the preservation of sea urchin gonads through a quick freezing operation.

It is another object to provide for frozen sea urchin gonads which have good color, flavor and texture, and which can be stored for long periods of time.

The following is a system that allows to preserve the sea urchin gonads, when placed under the freezing process, in perfect conditions over a long period and without loss of their natural organoleptical qualities of taste, appearance, odor and texture. The product is frozen in its raw condition thus making its degustation possible over a term of 6 months or more. The operating conditions of the process and the additives used do not affect mass consumption.

The invention is based on the use of the quick-freezing technique. After lengthy research and experiments, it has been possible to determine which is the appropriate method to make the procedure possible and successful for sea urchin (*Loxechinus Albus*) gonads; and that quick-freezing the sea urchin gonads previously treated with certain aqueous solution, as explained below, makes it feasible to preserve such products readily available for consumption under optimum conditions, over a period of 5,000 hours. This procedure consequently permits the commercial freezing of the product and its subsequent sale under similar conditions to those of the other frozen commodities.

The following detailed description of possible embodiments of the invention will now be set forth in order to provide a better understanding of the invention, it being understood that these embodiments are intended to be merely exemplary and in no way limitative.

DETAILED DESCRIPTION OF EMBODIMENTS

The description of the method subject of this invention is as follows:
a. The gonads of the sea urchin are removed.
b. Gonads are washed by conventional methods to remove undesirable matter unfit for quick-freezing. This is a common operation, well known to the skilled artisan, which is used in seafood preservation techniques in general.
c. Gonads are let to rest in an aqueous solution containing between 2 and 4 percent by weight of sodium chloride (NaCl). Resting time is approximately 30 minutes.
d. Gonads are then immersed in an aqueous solution containing between 8 and 12 percent of sodium chloride (NaCl), between 0.1 and 0.5 percent of sodium phosphate ($Na_3PO_4$), and between 0.05 and 0.2 percent of citric acid, percentages being expressed by weight. This aqueous solution is made up by conventional methods, e.g. merely mixing the components with water. Immersion period is approximately 15–20 minutes.

e. Gonads are then put under a quick-freezing process in accordance with known technology at such a temperature that freeze is introduced into the gonads at a speed not less than 2.5 centimeters an hour from the surface to the interior.

f. Conventional packing and cold storage, preferably at not over −5°C.

When making up the aqueous solutions, it should be noted that percentages as recited are expressed by weight; that is, in a total of 100 weight units of solution there shall be 8–12 weight units of sodium chloride; 0.1–0.5 weight units of sodium phosphate; 0.05–0.2 weight units of citric acid; balance is pure water (immersion solution). And there shall be 2–4 weight units of sodium chloride —balance pure water— in the resting solution. The narrow range of recited percentages will allow to any person skilled in the art the use of the method in actual conditions in which the process is carried out.

A preferred example is as follows:

For the aqueous resting solution:
3% sodium chloride.

For the aqueous immersion solution:
11% sodium chloride; 0.3% sodium phosphate; and 0.1% citric acid.

The foregoing description of the specific embodiments will so fully reveal the general nature of the invention that others can, by applying current knowledge, readily modify such specific embodiments and/or adapt them for various applications, without departing from the generic concept, and, therefore, such adaptions and modifications should and are intended to be comprehended within the meaning and range of equivalents of the disclosed embodiments. It is to be understood that the phraseology or terminology employed herein is for purposes of description and not of limitation.

What is claimed is:

1. A method for quick-freezing sea urchin gonads (*Loxechinus Albus*) for preservation purposes, comprising:

resting the washed gonads in an aqueous solution of 2–4% by weight sodium chloride for a period of approximately 30 minutes;

immersing said gonads into an aqueous solution of 8–12% by weight sodium chloride, 0.1 to 0.5% by weight sodium phosphate and 0.05 to 0.2% by weight citric acid, for a period of approximately 15–20 minutes;

and then quick-freezing said gonads at a speed not under 2.5 centimeters an hour.

2. A method in accordance with claim 1 wherein said aqueous solution for immersion comprises approximately 11% sodium chloride, 0.3% sodium phosphate and 0.1% citric acid.

* * * * *